Patented Jan. 14, 1930

1,743,680

UNITED STATES PATENT OFFICE

WILLIAM HENRY MOSS, OF CUMBERLAND, MARYLAND, ASSIGNOR TO CELANESE CORPORATION OF AMERICA, OF NEW YORK, N. Y., A CORPORATION OF DELAWARE

SOLUBLE AND FUSIBLE SYNTHETIC RESIN AND PROCESS OF MAKING THE SAME

No Drawing.   Application filed September 3, 1927.   Serial No. 217,535.

An object of this invention is to produce synthetic resins of the phenolic-aldehyde type that are fusible and soluble in solvents such as acetone, colorless or only slightly colored and which do not darken appreciably upon exposure to light.

A further object of this invention is to produce a synthetic resin of the phenolic-aldehyde type in the presence of a catalyst for promoting the condensation of the phenol and aldehyde that is very slow in its action. Other objects will appear from the following detailed description.

These objects are obtained by the use of di-hydrogen, mono alkali metal phosphates, such as sodium di-hydrogen phosphates ($NaH_2PO_4$) potassium di-hydrogen phosphate ($KH_2PO_4$), etc., as very slow or modifying catalysts in the preparation of phenolic-aldehyde resins. Other soluble di-hydrogen phosphates such as alkaline-earth di-hydrogen phosphates, for instance, $Ca(H_2PO_4)_2$ may be used as such catalysts.

In the preparation of a solid soluble phenol aldehyde resin for use, for example, in a cellulose ester lacquer, it is desirable that the proportions of free phenol and free aldehyde in the resin should be reduced to a minimum and that the melting point of the resin should be as high as possible. For this purpose it is desirable to start with or use during the process approximately equimolecular proportions of phenols and aldehydes or up to 20% or 30% excess aldehyde in order to avoid an excess of uncombined phenols in the products, which phenols must afterwards be removed in order to yield a product of maximum usefulness. These proportions of reactants are such that in the presence of either acid or alkaline catalysts at reaction temperatures of 90° C. or above, the soluble resins first formed are liable to change rapidly and completely to the insoluble, infusible type of resins.

Many proposals have been made for the preparation of artificial resins from phenols and aldehydes in which, after the initial liquid or semi-liquid product of condensation has been obtained, it is washed with hot or cold water, extracted with dilute solutions of alcohol or acetone etc., and steam or vacuum distilled.

It is a well known fact that the removal of the catalyst utilized to cause condensation is very difficult and tedious by any of these processes, and its presence during any of the said processes causes a gradual further condensation and hardening of the resin, which is liable to condense rapidly to the infusible resin as previously stated, and causes the resin to become useless for the purpose described.

I have found that while phosphoric acid and its di and tri-alkali metal salts are strong catalysts for the reaction between phenols and aldehydes, the so-called acid phosphates, that is, mono alkali metal di-hydrogen phosphates such as, mono sodium di-hydrogen phosphates, mono potassium di-hydrogen phosphates, mono ammonium di-hydrogen phosphates and the alkaline-earth di-hydrogen phosphates such as $Ca(H_2PO_4)_2$, are very weak catalysts for this reaction. The soluble solid resins formed when these so-called acid phosphates are used as catalysts are similar to those formed using phosphoric acid itself, but are much less liable to conversion to the insoluble, infusible type. I have also found that the condensation of phenols and aldehydes may be commenced using phosphoric acid as the catalyst and continued to any stage at which the product of reaction remains soluble in acetone or alcohol, and that on addition of the theoretical amount of alkali or alkaline-earth oxide or hydroxide necessary to neutralize the phosphoric acid to the mono alkali metal di-hydrogen phosphate or the alkaline-earth di-hydrogen phosphate, the reaction is modified and thereafter proceeds at a much slower rate, so that a high melting point soluble resin can be made without risk or danger of conversion to the insoluble resin.

It is essential that the neutralization of the phosphoric acid should not be carried to the di-alkali metal mono hydrogen stage or beyond, for in this case the rate of reaction is again increased, and the tendency to rapid over-condensation or conversion to the insoluble resin again appears.

The following examples of carrying out my invention are here given by way of illustration only, and the claims are not limited to these examples:

*Example I*

1000 grams phenol
1200 grams 40% formaldehyde solution
200 grams sodium di-hydrogen phosphate are heated under reflux when a separation of the reactants into two layers occurs after several hours heating. The heating is continued under reflux until the lower layer is a resin having a melting point of from 40° to 50° C. The two layers are then separated and the lower layer washed with hot water, extracted with solvents, vacuum or steam distilled as desired, until a hard, soluble resin of higher melting point, say from 60° to 110° C. is obtained.

*Example II*

A resin having a melting point of 40° C. to 50° C. is prepared by heating the ingredients set forth in Example I under reflux. The whole of the reaction mass without washing or separation of the two layers is steam distilled until a hard, soluble resin having a higher melting point, say from 60° to 110° C. is obtained.

*Example III*

1000 grams phenol
1200 grams formaldehyde (40% solution)
20 grams phosphoric acid are heated under reflux until a resin having a melting point from 20° C. to 40° C. is obtained. Then 10.8 grams of sodium carbonate are added. Instead of sodium carbonate, a chemically equivalent amount of sodium hydroxide may be used. The heating is continued without separation of the upper layer of liquid and the whole is then steam distilled for several hours until a high melting point resin is obtained.

The foregoing specific examples are given merely as instances of methods of carrying out my invention, and it is understood that variations may be made therein without departing from the spirit of my invention. For instance, the proportions of the formaldehyde and of the phenol may be varied. Likewise the amount of catalyst used may be changed within wide limits. Moreover instead of phenol and formaldehyde, phenol and paraformaldehyde may be used as starting materials; cresol and formaldehyde may also be used.

The resin resulting from my process is hard, but fusible with a melting point preferably from 60° to 110° C., is light colored, and is fast to light. It is soluble in organic solvents such as acetone and alcohol. Because of these properties it is useful as a solid constituent in lacquers or varnishes containing organic derivatives of cellulose such as organic esters of cellulose (e. g. cellulose acetate, cellulose formate, cellulose propionate, etc.) and cellulose ethers (e. g. methyl cellulose or ethyl cellulose etc.) as set forth in my application Serial No. 217,536, filed September 3, 1927.

Having described my invention what I claim and desire to secure by Letters Patent is:

1. In the process of preparing synthetic resin of the phenolic-aldehyde type, the step of condensing a phenol and an aldehyde in the presence of a soluble di-hydrogen phosphate as catalyst.

2. In the process of preparing synthetic resin of the phenolic-aldehyde type, the step of condensing a phenol and an aldehyde in the presence of a mono alkali metal di-hydrogen phosphate as catalyst.

3. The process of preparing synthetic resins comprising heating together a phenol and an aldehyde in the presence of phosphoric acid and prior to the formation of an insoluble and infusible resin, adding substantially just sufficient alkaline material to convert all the phosphoric acid into a di-hydrogen phosphate.

4. The process of preparing synthetic resins comprising heating together a phenol and an aldehyde in the presence of phosphoric acid and prior to the formation of an insoluble and infusible resin adding substantially just sufficient alkali to convert all the phosphoric acid into a di-hydrogen phosphate.

5. A soluble phenolic-aldehyde resin, which resin is fusible, soluble in organic solvents, light in color, and which does not become appreciably discolored when exposed to light, said resin being formed by the condensation of phenol and aldehyde in the presence of a mono alkali metal di-hydrogen phosphate.

In testimony whereof, he has hereunto subscribed his name.

WILLIAM HENRY MOSS.